United States Patent
Wu et al.

(10) Patent No.: US 11,301,769 B2
(45) Date of Patent: Apr. 12, 2022

(54) METHOD FOR RECOGNIZING MULTI-DIMENSIONAL ANOMALOUS URBAN TRAFFIC EVENT BASED ON TERNARY GAUSSIAN MIXTURE MODEL

(71) Applicant: SHANGHAI SEARI INTELLIGENT SYSTEM CO., LTD., Shanghai (CN)

(72) Inventors: Chaoteng Wu, Shanghai (CN); Lu Zhang, Shanghai (CN); Xiao Gao, Shanghai (CN); Yu Zhou, Shanghai (CN); Wei Zhao, Shanghai (CN); Xuechen Yang, Shanghai (CN)

(73) Assignee: SHANGHAI SEARI INTELLIGENT SYSTEM CO., LTD., Shanghai (CN)

( * ) Notice: Subject to any disclaimer, the term of this patent is extended or adjusted under 35 U.S.C. 154(b) by 0 days.

(21) Appl. No.: 17/424,890

(22) PCT Filed: Apr. 13, 2020

(86) PCT No.: PCT/CN2020/084556
§ 371 (c)(1),
(2) Date: Jul. 22, 2021

(87) PCT Pub. No.: WO2021/036277
PCT Pub. Date: Mar. 4, 2021

(65) Prior Publication Data
US 2022/0083885 A1   Mar. 17, 2022

(30) Foreign Application Priority Data
Aug. 30, 2019 (CN) .......................... 201910820821.2

(51) Int. Cl.
*G06N 7/00* (2006.01)
*G08G 1/01* (2006.01)

(52) U.S. Cl.
CPC ........... *G06N 7/005* (2013.01); *G08G 1/0125* (2013.01)

(58) Field of Classification Search
CPC .............................. G06N 7/005; G08G 1/0125
See application file for complete search history.

(56) References Cited

U.S. PATENT DOCUMENTS

2018/0165554 A1* 6/2018 Zhang .................. G06N 3/0454

FOREIGN PATENT DOCUMENTS

| CN | 103065466 A | 4/2013 |
|---|---|---|
| CN | 104574968 A | 4/2015 |

(Continued)

*Primary Examiner* — Ian Jen
(74) *Attorney, Agent, or Firm* — Bayramoglu Law Offices LLC

(57) ABSTRACT

A method for recognizing multi-dimensional anomalous urban traffic events based on a ternary Gaussian mixture model includes: reading a data sample of urban road traffic events; randomly dividing the data sample into a first subsample and a second subsample; performing modeling based on the first subsample by using the ternary Gaussian mixture model to obtain a second ternary Gaussian mixture model to calculate a distribution probability p of any sample point; clustering the second subsample, recognizing an outlier in the second subsample, and labeling the outlier and a normal point to obtain a labeled subsample; calculating the labeled subsample to obtain the distribution probability p corresponding to each sample point in the labeled subsample; when a new traffic event occurs, obtaining features of three dimensions of the new traffic event, calculating a distribution probability p by using the second model, and recognizing the new traffic event as anomalous if p<t-score.

3 Claims, 3 Drawing Sheets

(56) References Cited

FOREIGN PATENT DOCUMENTS

| | | |
|---|---|---|
| CN | 109615860 A | 4/2019 |
| CN | 110083802 A | 8/2019 |
| CN | 110634288 A | 12/2019 |
| JP | 3758534 B2 | 3/2006 |

* cited by examiner

METHOD FOR RECOGNIZING MULTI-DIMENSIONAL ANOMALOUS URBAN TRAFFIC EVENT BASED ON TERNARY GAUSSIAN MIXTURE MODEL

CROSS REFERENCE TO THE RELATED APPLICATIONS

This application is the national phase entry of International Application No. PCT/CN2020/084556, filed on Apr. 13, 2020, which is based upon and claims priority to Chinese Patent Application No. 201910820821.2, filed on Aug. 30, 2019, the entire contents of which are incorporated herein by reference.

TECHNICAL FIELD

The present invention belongs to the technical field of intelligent traffic applications, and more particularly, relates to a method for intelligent recognition of multi-dimensional anomalous urban traffic events based on a ternary Gaussian mixture model and clustering.

BACKGROUND

The comprehensive perception of urban road traffic conditions, especially the recognition and warning of anomalous urban traffic events, provides data support and a theoretical basis for alleviating traffic congestion and increasing traffic safety, and thus has important implications for improving the urban traffic management and decision-making capacity. At present, the main research focus is on the recognition of anomalous events on expressways, but there is a lack of research on the recognition of anomalous urban traffic events.

SUMMARY

An objective of the present invention is to study, recognize, and determine anomalous urban traffic events based on traffic big data by using an artificial intelligence algorithm.

To achieve the above-mentioned objective, the technical solutions of the present invention provide a method for recognizing multi-dimensional anomalous urban traffic events based on a ternary Gaussian mixture model, including the following steps:

step 1: reading a data sample S of urban road traffic events, wherein an input X of the data sample S includes features of three dimensions: a traffic event quantity based on an event sequence, a weather condition, and a traffic congestion index;

step 2: randomly dividing the data sample S into a subsample S1 and a subsample S2;

step 3: performing modeling based on the subsample S1 by using the ternary Gaussian mixture model to obtain a ternary Gaussian mixture model M, wherein the ternary Gaussian mixture model M is configured to calculate a distribution probability p of any sample point;

step 4: clustering the subsample S2 by using a density-based spatial clustering of applications with noise (DBSCAN) algorithm, recognizing an outlier in the subsample S2, and labeling the outlier and a normal point to change the subsample S2 to a labeled subsample S3;

step 5: calculating the subsample S3 by using the ternary Gaussian mixture model M obtained in step 3 to obtain a distribution probability p corresponding to each sample point x in the subsample S3, wherein a distribution probability p allowing F1score to reach a maximum is a threshold t-score, and F1score is calculated by the following formula:

$$F1score = \frac{2 \cdot precision \cdot recall}{precision + recall},$$

wherein $$precision = \frac{tp}{tp + fp},$$

$$recall = \frac{tp}{tp + fn},$$

tp represents a quantity of true-positive sample points, fp represents a quantity of false-positive sample points, fn represents a quantity of false-negative sample points, the true-positive sample point is defined as a sample point with both an anomalous model prediction result and an anomalous actual result, the false-positive sample point is defined as a sample point with an anomalous model prediction result but a normal actual result, and the false-negative sample point is defined as a sample point with a normal model prediction result but an anomalous actual result, wherein a method of selecting the threshold t-score includes the following steps:

step 501: initializing an initial value of p' and a highest value best_f1 of F1score, as 0, and selecting a step, wherein step=(max(P3)−min(P3))/1000, wherein P3 represents a set of the distribution probability p corresponding to each sample point x in the S3;

step 502: setting the value of $p_1$' to a sum of a minimum value in the P3 and one step, namely, $p_1$'=min(P3)+step;

step 503: extracting a sample point whose distribution probability p is less than $p_1$' from the subsample S3, determining, by using the ternary Gaussian mixture model M, that the sample point is an outlier, calculating the F1score, and denoting the calculated value as f1;

step 504: comparing f1 and best_f1; if f1 is greater than best_f1, setting the value of best_f1 to f1, and assigning the value of $p_1$' to p', namely, p'=$p_1$; and if f1 is not greater than best_f1, keeping the value of best_f1 and the value of p' unchanged; and step 505: repeating steps 502 to 504 cyclically, and increasing $p_1$' by one step each time until $p_1$'=max (P3), wherein the final value of p' is the threshold t-score of an anomalous event on the urban road section; and step 6: when a new traffic event occurs, obtaining features of three dimensions of the new traffic event, calculating a distribution probability p by using the ternary Gaussian mixture model M, and recognizing the new traffic event as anomalous if p<t-score.

Preferably, in step 2, the ratio of the subsample S1 to the subsample S2 is 9:1.

Preferably, in step 5, the distribution probability p is calculated by the following formula:

$$p(x; \mu, \Sigma) = \frac{1}{(2\pi)^{n/2}|\Sigma|^{1/2}} \exp\left(-\frac{1}{2}(x-\mu)^T \Sigma^{-1}(x-\mu)\right);$$

wherein p (x; μ, Σ) represents a distribution probability of a sample point x in the subsample S3, μ represents a mean vector of each dimension in the subsample S3, $\mu=[\mu_1, \mu_2, \mu_3]$, wherein $\mu_1$ represents a mean value of the traffic event quantity, $\mu_2$ represents a mean value of the weather condition, $\mu_3$ represents a mean value of the traffic congestion index, Σ represents a covariance matrix of each dimension in the subsample S3, $$\sum = \begin{matrix} \sigma_1^2 & 0 & 0 \\ 0 & \sigma_2^2 & 0 \\ 0 & 0 & \sigma_3^2 \end{matrix},$$

$\sigma_1$ represents a standard deviation of the traffic event quantity, $\sigma_2$ represents a standard deviation of the weather condition, and $\sigma_3$ represents a standard deviation of the traffic congestion index.

In the present invention, anomalous urban traffic events are automatically recognized and determined by using an artificial intelligence algorithm. The recognition of the anomalous events is not limited to a single alert, but involves the comprehensive consideration of event data such as alerts, accidents, and construction. The method is thus applicable to a whole city at a macro level, a region at a meso level, and a road section at a micro level.

BRIEF DESCRIPTION OF THE DRAWINGS

FIG. 2A is a two-dimensional (2D) cross-sectional view of the anomaly recognition and threshold effect of the two features which are Traffic event quantity and Traffic congestion index. FIG. 2B is a two-dimensional (2D) cross-sectional view of the anomaly recognition and threshold effect of the two features which are Traffic event quantity and Weather condition. FIG. 2C is a two-dimensional (2D) cross-sectional view of the anomaly recognition and threshold effect of the two features which are Traffic congestion index and Weather condition.

DETAILED DESCRIPTION OF THE EMBODIMENTS

Figure 1:
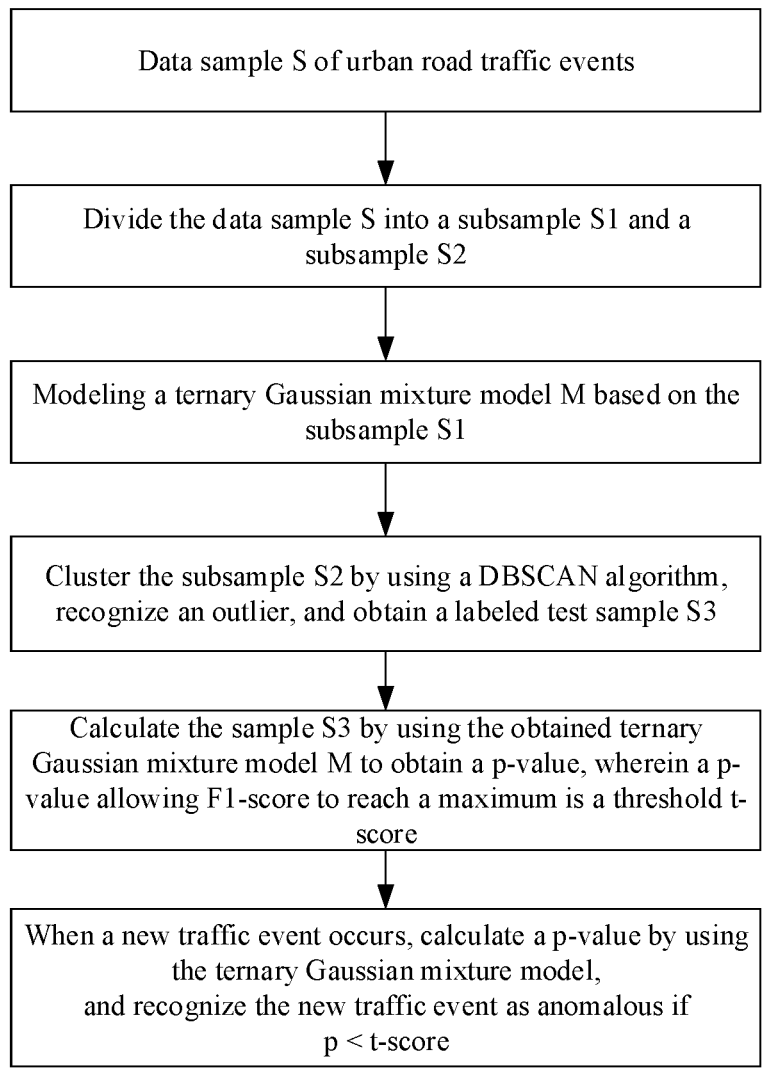
FIG. 1 shows the overall process of recognizing anomalous urban events based on a ternary Gaussian mixture model and clustering.
Figure 2A:
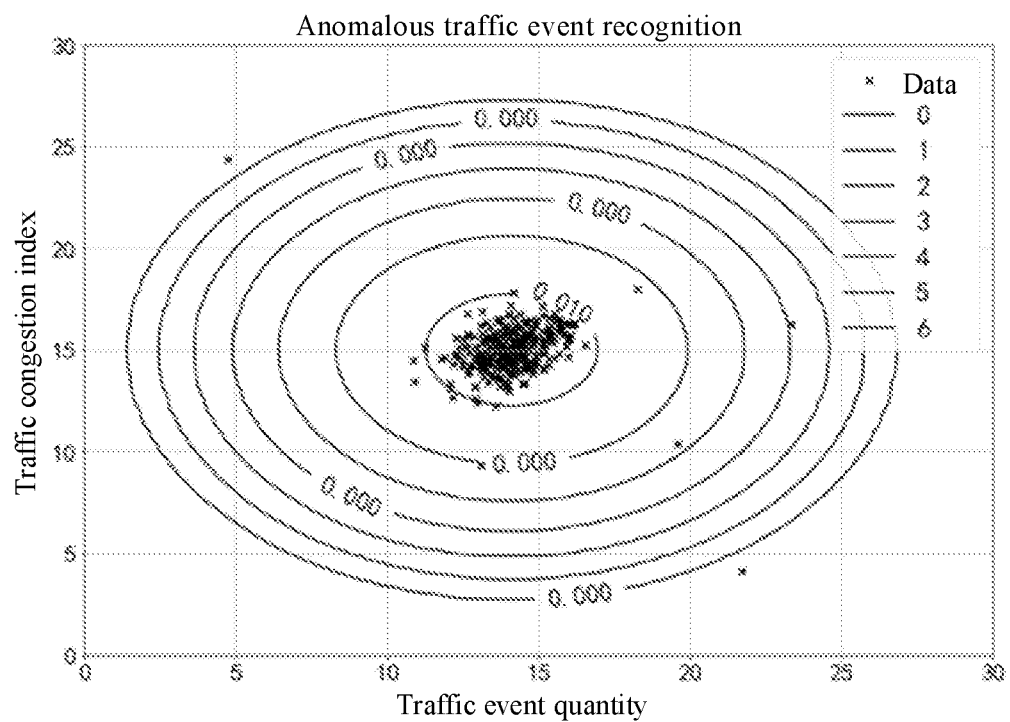
FIGS. 2A-2C show the effect and threshold of anomaly recognition based on the ternary Gaussian mixture model. The ternary features are Traffic congestion index, Traffic event quantity and Weather condition. The original image is 3D, but for the convenience of display, it is represented by 2D profile.
Figure 2B:
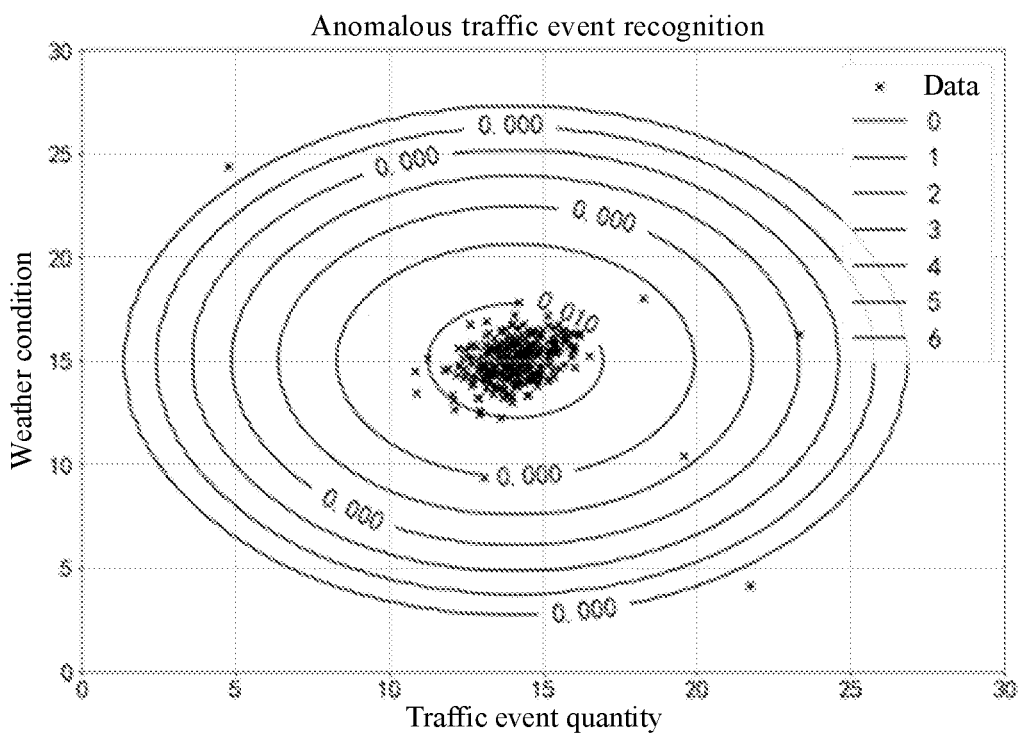
Figure 2C:
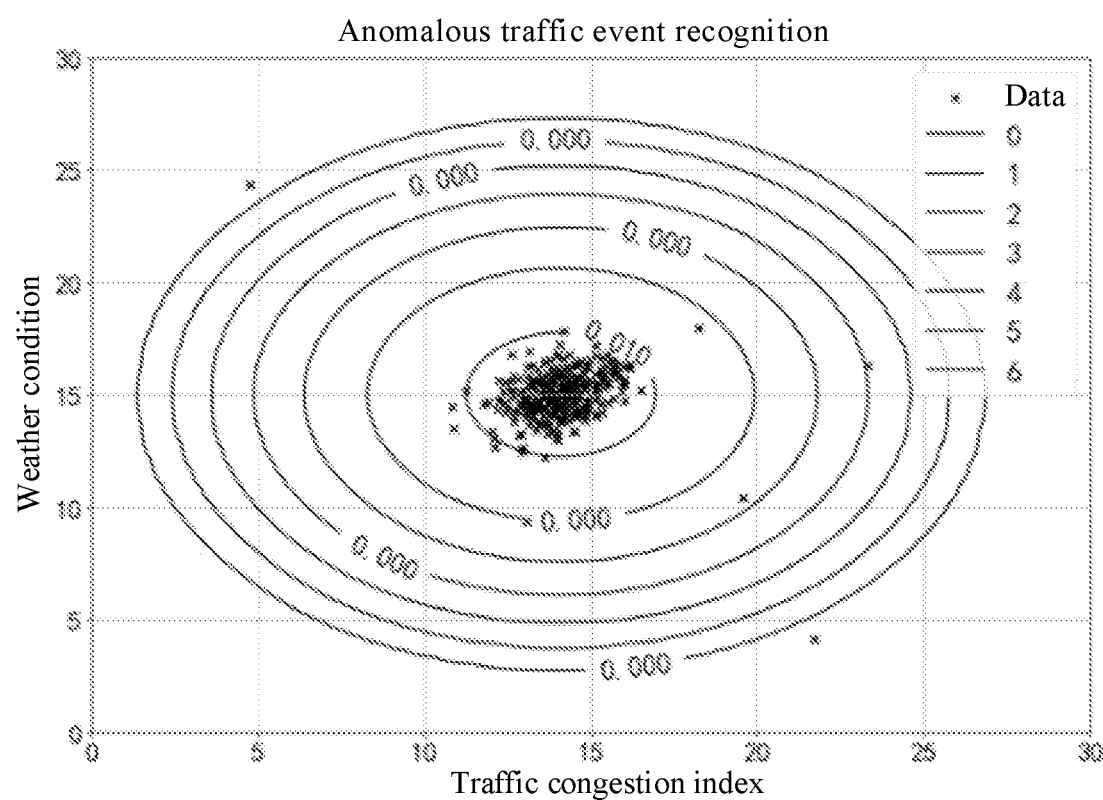

The present invention will be described in detail below with reference to the specific embodiments. It should be understood that these embodiments are only used to describe the present invention rather than to limit the scope of the present invention. In addition, those skilled in the art may make various changes and modifications to the present invention after reading the content of the present invention, and these equivalent forms shall also fall within the scope defined by the appended claims of the present invention.

According to the present invention, anomalous urban traffic events are recognized automatically. Not only a warning point with a high incidence of anomalies, but also a point with problematic data quality and a point with missing data are detected and then defined as anomalous events. The method includes the following steps:

Step 1: a data sample S of urban road traffic events is read, wherein an input X of the data sample S includes features of three dimensions: a traffic event quantity based on an event sequence, a weather condition, and a traffic congestion index, namely, $S=[x_1^{(1 \cdots n)}, x_2^{(1 \cdots n)}, x_3^{(1 \cdots n)}]$, wherein $x_1^n$ represents a traffic event quantity of the $n^{th}$ sample in the data sample S, $x_2^n$ represents a weather condition of the $n^{th}$ sample in the data sample S, and $x_3^n$ represents a traffic congestion index of the $n^{th}$ sample in the data sample S.

Step 2: the data sample S is randomly divided into a subsample S1 and a subsample S2, wherein a ratio of the subsample S1 to the subsample S2 is 9:1, namely, $S1=[x_1^{(1 \cdots m)}, x_2^{(1 \cdots m)}, x_3^{(1 \cdots m)}]$ and $S2=[x_1^{(1 \cdots n-m)}, x_2^{(1 \cdots n-m)}, x_3^{(1 \cdots n-m)}]$, wherein m represents a quantity of samples in the subsample S1.

Step 3: modeling is performed based on the subsample $S1=[x_1^{(1 \cdots m)}, x_2^{(1 \cdots m)}, x_3^{(1 \cdots m)}]$ by using the ternary Gaussian mixture model to obtain a ternary Gaussian mixture model M, wherein the ternary Gaussian mixture model M is configured to calculate a distribution probability p of any sample point, and a ternary Gaussian distribution is calculated by the following formula:

$$p(x; \mu, \sum) = \frac{1}{(2\pi)^{n/2}|\sum|^{1/2}} \exp\left(-\frac{1}{2}(x-\mu)^T \sum\nolimits^{-1} (x-\mu)\right);$$

wherein, p represents a probability distribution; x represents a single sample point, and there are a total of m sample points in the subsample S1; μ represents a mean vector of each dimension in the subsample S1, to be specific, $\mu_1=\text{Mean}(x_1^{(1 \cdots m)})$, representing a mean value of the traffic event quantity, $\mu_2=\text{Mean}(x_2^{(1 \cdots m)})$, representing a mean value of the weather condition, and $\mu_3=\text{Mean}(x_3^{(1 \cdots m)})$, representing a mean value of the traffic congestion index, and $\mu=[\mu_1, \mu_2, \mu_3]$; Σ represents a covariance matrix of each dimension in the subsample S3, $$\sum = \begin{matrix} \sigma_1^2 & 0 & 0 \\ 0 & \sigma_2^2 & 0 \\ 0 & 0 & \sigma_3^2 \end{matrix},$$

$\sigma_1$ represents a standard deviation of the traffic event quantity, $\sigma_2$ represents a standard deviation of the weather condition, and $\sigma_3$ represents a standard deviation of the traffic congestion index; and T represents transposition of a matrix.

Step 4: the subsample S2 is clustered by using a density-based spatial clustering of applications with noise (DBSCAN) algorithm, an outlier in the subsample S2 is recognized, and the outlier and a normal point (0 represents the normal point, and 1 represents the outlier) are labeled to obtain a labeled subsample S3, namely $S3=[x_1^{(1 \cdots n-m)}, x_2^{(1 \cdots n-m)}, x_3^{(1 \cdots n-m)}, y^{(1 \cdots n-m)}]$.

Step 5: the subsample S3 is calculated by using the ternary Gaussian mixture model M obtained in step 3 to obtain a p-value corresponding to each sample point x in the subsample S3 as $P3=[p3_1, p3_2, p3_3, \ldots, p3_{n-m}]$, wherein a p' value allowing F1score to reach a maximum is a threshold t-score, and F1score is calculated by the following formula:

$$F1score = \frac{2 \cdot precision \cdot recall}{precision + recall},$$

wherein $$precision = \frac{tp}{tp + fp},$$

$$recall = \frac{tp}{tp + fn},$$

tp represents a quantity of true-positive sample points, fp represents a quantity of false-positive sample points, fn represents a quantity of false-negative sample points, the true-positive sample point is defined as a sample point with both an anomalous model prediction result and an anomalous actual result, the false-positive sample point is defined as a sample point with an anomalous model prediction result but a normal actual result, and the false-negative sample point is defined as a sample point with a normal model prediction result but an anomalous actual result.

In step 5, a method of selecting the threshold t-score includes the following steps:

Step 501: an initial value of p' and a highest value best_f1 of F1score are initialized as 0, and a step is selected, wherein step=(max(P3)−min(P3))/1000, wherein P3 represents a set of the distribution probability p corresponding to each sample point x in the S3.

Step 502: the value of $p_1$' is set to a sum of a minimum value in the P3 and one step, namely, $p_1$'=min(P3)+step.

Step 503: a sample point whose distribution probability p is less than $p_1$' is extracted from the subsample S3, the ternary Gaussian mixture model M determines that the sample point is an outlier, the F1score is calculated, and the calculated value is denoted as f1.

Step 504: f1 is compared with best_f1; if f1 is greater than best_f1, the value of best_f1 is set to f1, and the value of $p_1$' is assigned to p', namely, p'=$p_1$; and if f1 is not greater than best_f1, the value of best_f1 and the value of p' are kept unchanged.

Step 505: steps 502 to 504 are repeated cyclically, and $p_1$' is increased by one step each time until $p_1$'=max (P3).

The final value of p' is the threshold t-score of an anomalous event on the urban road section.

Step 6: When a new traffic event occurs, features of three dimensions of the new traffic event are obtained, a distribution probability p is calculated by using the ternary Gaussian mixture model M, and the new traffic event is recognized as anomalous if p<t-score.

What is claimed is:
1. A method for recognizing multi-dimensional anomalous urban traffic events based on a second ternary Gaussian mixture model, comprising the following steps:
   step 1: reading a data sample of urban road traffic events using processor, wherein an input of the data sample comprises features of three dimensions comprising a traffic event quantity based on an event sequence, a weather condition, and a traffic congestion index;
   step 2: randomly dividing the data sample into a first subsample and a second subsample;
   step 3: performing a modeling using based on the first subsample using the processor by using a first ternary Gaussian mixture model to obtain the second ternary Gaussian mixture model, wherein the second ternary Gaussian mixture model is configured to calculate a distribution probability p of any sample point;
   step 4: clustering the second subsample by using a density-based spatial clustering of applications with noise (DBSCAN) algorithm, recognizing a first outlier in the second subsample, and labeling the first outlier and a normal point to change the second subsample to a labeled subsample;
   step 5: calculating the labeled subsample by using the second ternary gaussian mixture model obtained using the processor in step 3 to obtain the distribution probability p corresponding to each sample point x in the labeled subsample, wherein a distribution probability p allowing F1score to reach a maximum is a threshold t-score, and F1score is calculated by the following formula:

$$F1score = \frac{2 \cdot precision \cdot recall}{precision + recall},$$

wherein $$precision = \frac{tp}{tp + fp},$$

$$recall = \frac{tp}{tp + fn},$$

tp represents a quantity of true-positive sample points, fp represents a quantity of false-positive sample points, fn represents a quantity of false-negative sample points, the true-positive sample points are defined as first sample points with both a first anomalous model prediction result and a first anomalous actual result, the false-positive sample points are defined as second sample points with a second anomalous model prediction result and a normal actual result, and the false-negative sample points are defined as third sample points with a normal model prediction result and a second anomalous actual result, wherein a method of selecting the threshold t-score comprises the following steps:
   step 501: initializing an initial value of p' and a highest value best_f1 of F1score as 0, and selecting a step, wherein step=(max(P3)−min(P3))/1000, wherein P3 represents a set of the distribution probability p corresponding to the each sample point x in the labeled subsample;
   step 502: setting a value of $p_1$' to a sum of a minimum value in the P3 and one step to obtain $p_1$'=min(P3)+step;
   step 503: extracting a sample point with a distribution probability p less than $p_1$' from the labeled subsample, determining, by using the second ternary Gaussian mixture model, that the sample point is a second outlier, calculating the F1score, and denoting a calculated value as f1;

step 504: comparing f1 and best_f1; if f1 is greater than best_f1, setting a value of best_f1 to f1, and assigning a value of $p_1'$ to p' to obtain $p'=p_1$; and if f1 is not greater than best_f1, keeping the value of best_f1 and a value of p' unchanged; and step 505: repeating steps 502 to 504 cyclically, and increasing $p_1'$ by one step each time until $p_1'$=max (P3), wherein a final value of p' is the threshold t-score of an anomalous event on an urban road section; and step 6: when a new traffic event occurs, obtaining features of three dimensions of the new traffic event, calculating a distribution probability p by using the second ternary Gaussian mixture model, and recognizing the new traffic event as anomalous if p<t-score.

2. The method for recognizing the multi-dimensional anomalous urban traffic events based on the second ternary Gaussian mixture model according to claim 1, wherein
in step 2, a ratio of the first subsample to the second subsample is 9:1.

3. The method for recognizing the multi-dimensional anomalous urban traffic events based on the second ternary Gaussian mixture model according to claim 1, wherein
in step 5, the distribution probability p is calculated by the following formula:

$$p(x; \mu, \Sigma) = \frac{1}{(2\pi)^{n/2}|\Sigma|^{1/2}} \exp\left(-\frac{1}{2}(x-\mu)^T \Sigma^{-1}(x-\mu)\right);$$

wherein p (x; μ, Σ) represents a distribution probability of a sample point x in the labeled subsample, μ represents a mean vector of each dimension in the labeled subsample, $\mu=[\mu_1, \mu_2, \mu_3]$, $\mu_1$ represents a mean value of the traffic event quantity, $\mu_2$ represents a mean value of the weather condition, $\mu_3$ represents a mean value of the traffic congestion index, Σ represents a covariance matrix of the each dimension in the labeled subsample, $$\Sigma = \begin{matrix} \sigma_1^2 & 0 & 0 \\ 0 & \sigma_2^2 & 0 \\ 0 & 0 & \sigma_3^2 \end{matrix},$$

$\sigma_1$ represents a standard deviation of the traffic event quantity, $\sigma_2$ represents a standard deviation of the weather condition, and $\sigma_3$ represents a standard deviation of the traffic congestion index.

* * * * *